(12) United States Patent
Kim

(10) Patent No.: US 8,596,549 B2
(45) Date of Patent: Dec. 3, 2013

(54) AUTHORIZING THE USE OF A TRANSACTION CARD

(76) Inventor: Moon J. Kim, Wappingers Falls, NY (US)

( * ) Notice: Subject to any disclaimer, the term of this patent is extended or adjusted under 35 U.S.C. 154(b) by 105 days.

(21) Appl. No.: 13/101,211

(22) Filed: May 5, 2011

(65) Prior Publication Data

US 2012/0280048 A1 Nov. 8, 2012

(51) Int. Cl.
*G06K 19/06* (2006.01)
*G06K 5/00* (2006.01)

(52) U.S. Cl.
USPC .......................................... 235/493; 235/380

(58) Field of Classification Search
USPC .......................................... 235/380, 492, 493
See application file for complete search history.

(56) References Cited

U.S. PATENT DOCUMENTS

| | | | |
|---|---|---|---|
| 4,614,861 A * | 9/1986 | Pavlov et al. | 235/380 |
| 4,916,296 A | 4/1990 | Streck | |
| 4,954,985 A | 9/1990 | Yamazaki | |
| 6,050,494 A | 4/2000 | Song et al. | |
| 6,089,451 A | 7/2000 | Krause | |
| 6,325,285 B1 | 12/2001 | Baratelli | |
| 6,398,115 B2 | 6/2002 | Krause | |
| 6,641,050 B2 | 11/2003 | Kelley et al. | |
| 6,662,166 B2 | 12/2003 | Pare, Jr. et al. | |
| 6,715,679 B1 | 4/2004 | Infosino | |
| 6,997,381 B2 | 2/2006 | Arnouse | |
| 7,028,897 B2 | 4/2006 | Fernandes et al. | |
| 7,051,932 B2 | 5/2006 | Fernandes et al. | |
| 7,070,112 B2 | 7/2006 | Beenau et al. | |
| 7,153,557 B2 * | 12/2006 | Rancien | 428/40.2 |
| 7,172,115 B2 | 2/2007 | Lauden | |
| 7,192,628 B2 * | 3/2007 | Burrows | 427/598 |
| 7,205,473 B2 | 4/2007 | Li et al. | |
| 7,246,752 B2 | 7/2007 | Brown | |
| 7,252,232 B2 | 8/2007 | Fernandes et al. | |
| 7,277,562 B2 | 10/2007 | Zyzdryn | |
| 7,278,581 B2 | 10/2007 | Ong | |
| 7,306,158 B2 | 12/2007 | Berardi et al. | |
| 7,314,164 B2 | 1/2008 | Bonalle et al. | |
| 7,328,850 B2 * | 2/2008 | Sines | 235/492 |
| 7,341,181 B2 | 3/2008 | Bonalle et al. | |

(Continued)

OTHER PUBLICATIONS

"Citala's innovative flexible display technology", Printed Electronics World, Dec. 16, 2008, 4 pages. http://www.printedelectronicsworld.com/articles/citalas_innovative_flexible_displaytech....

(Continued)

*Primary Examiner* — Jamara Franklin
(74) *Attorney, Agent, or Firm* — Hunter E. Webb; Keohane & D'Alessandro, PLLC

(57) ABSTRACT

Embodiments of the present invention provide systems and methods for validating a user of a transaction card. Specifically, embodiments of the present invention utilize dynamic manipulation of a transaction card to authorize use of the card. In a typical embodiment, the cardholder approaches a magnetic reader with the card. The card is powered up by an embedded radio frequency identification (RFID) antenna in a magnetic field. The cardholder enters a user authorization code using an input method. The entry is compared against the predefined user authorization code. If the entry is invalid, an unauthorized code is put on virtual ferromagnetic cells (VFC) embedded in the card. If the entry is valid, legitimate card information is put into the VFC. When the card is swiped, magnetic information on the VFC is coupled, amplified, and recorded to the reader. After cardholder use, the VFC are reset to a random or unauthorized mode.

18 Claims, 11 Drawing Sheets

(56) References Cited

U.S. PATENT DOCUMENTS

| | | |
|---|---|---|
| 7,438,234 B2 | 10/2008 | Bonalle et al. |
| 7,445,149 B2 | 11/2008 | Bonalle et al. |
| 7,451,924 B2 | 11/2008 | Bonalle et al. |
| 7,451,925 B2 | 11/2008 | Bonalle et al. |
| 7,500,616 B2 | 3/2009 | Beenau et al. |
| 7,533,828 B2 | 5/2009 | Ong |
| 7,543,156 B2 | 6/2009 | Campisi |
| 7,591,416 B2 | 9/2009 | Blossom |
| 7,637,343 B2 | 12/2009 | Beenau et al. |
| 7,677,459 B2 | 3/2010 | Arnouse |
| 7,690,577 B2 | 4/2010 | Beenau et al. |
| 7,780,091 B2 | 8/2010 | Beenau et al. |
| 7,793,851 B2 | 9/2010 | Mullen |
| 7,814,332 B2 | 10/2010 | Beenau et al. |
| 7,828,220 B2 | 11/2010 | Mullen |
| 7,909,247 B2 | 3/2011 | Bonalle et al. |
| 2006/0161789 A1 | 7/2006 | Doughty et al. |
| 2006/0170530 A1 | 8/2006 | Nwosu et al. |
| 2006/0224504 A1 | 10/2006 | Nwosu et al. |
| 2007/0033150 A1 | 2/2007 | Nwosu |
| 2007/0241183 A1 | 10/2007 | Brown et al. |
| 2008/0040274 A1 | 2/2008 | Uzo |
| 2008/0120236 A1 | 5/2008 | Faith et al. |
| 2008/0222047 A1 | 9/2008 | Boalt |
| 2008/0278325 A1 | 11/2008 | Zimman et al. |
| 2009/0248581 A1 | 10/2009 | Brown |
| 2010/0082444 A1 | 4/2010 | Lin et al. |

OTHER PUBLICATIONS

Crouch_"Credit Card Magnetic Stripes Get Smarter", Fox Business, Mar. 4, 2011, 3 pages. http://www.foxbusiness.com/personal-finance/2011/03/04/credit card-magnetic-stripes-sm....

"Pixels in your pocket", Jon Peddie Research, News Watch, Jul. 3, 2006, vol. 6, No. 14.

McFadden, L., "Programmable Credit Cards", Bankrate.com, Sep. 16, 2010, 3 pages. http://bankrate.com/financing/credit-cards/programmable-credit-cards/.

"IC Card V.S. RFID", EMBA reports (2006). http://joung.im.ntu.edu.tw/teaching/EMBADIS/2006EMBA/reports?IT1_IC-RFID.ppt.

Fazzalaro, J., "The Real ID Act, Enhanced Drivers' Licenses, and Related Applications", OLR Research Report, Nov. 16, 2007, 10 pages. http://www.cga.ct.gov/2007/rpt/2007-R-0659.htm.

Hale, J., "This year's hot new gadget? Programmable credit cards", Savings Accounts.com, Jan. 14, 2011, 5 pages. http://www.savingsaccounts.com/bankingnews/this-years-hot-new-gadget-programmable-c....

* cited by examiner

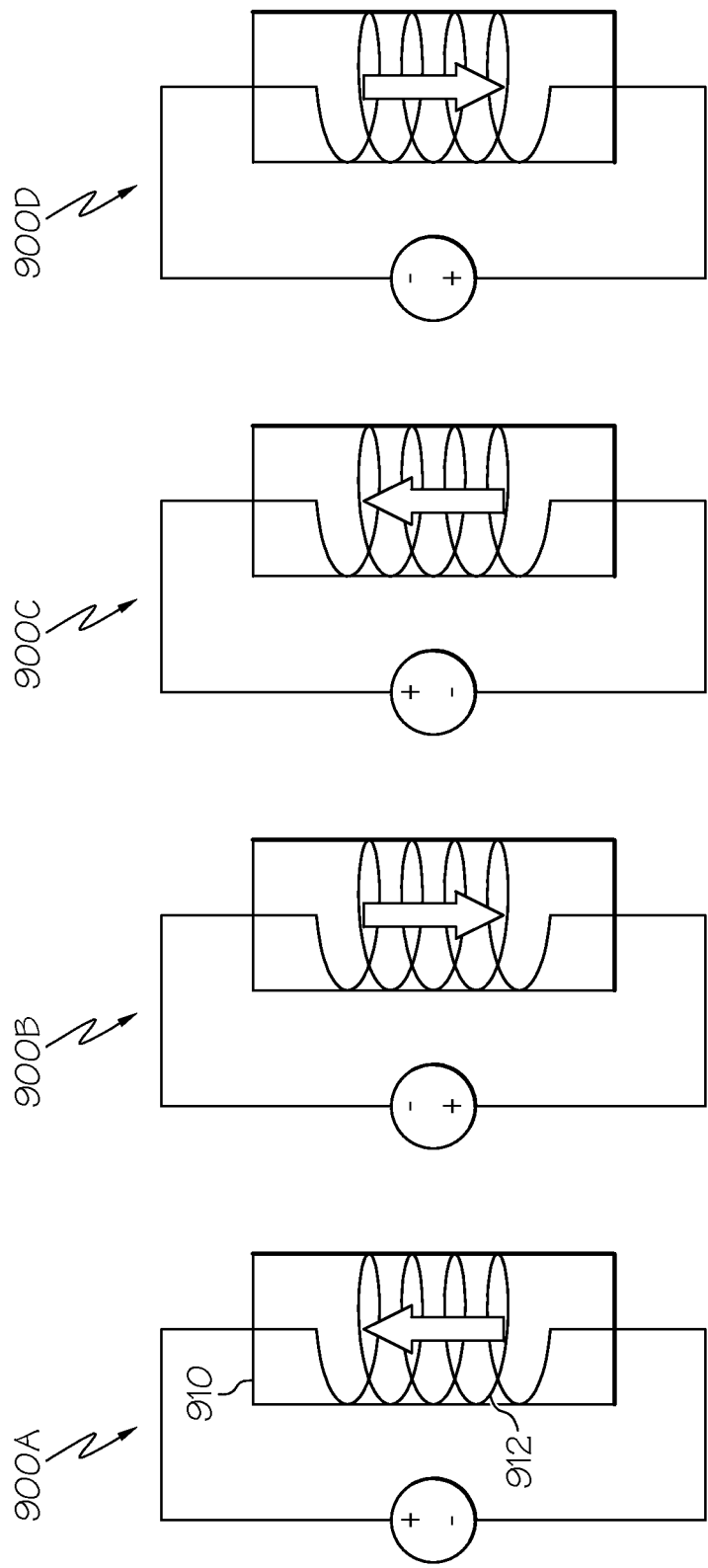

AUTHORIZING THE USE OF A TRANSACTION CARD

FIELD OF THE INVENTION

In general, the present invention relates to authorization cards. Specifically, the present invention relates to systems and methods for authorizing the use of a transaction card.

BACKGROUND OF THE INVENTION

As global fraud concerns relating to credit cards continue to grow, many card issuers are attempting to come up with more secure credit cards for their cardholders. Existing methods for combating fraud still, at times, leave merchants and banks vulnerable. Heretofore, several unsuccessful attempts have been made to address these shortcomings.

U.S. Pat. No. 7,909,247 discloses a wireless transaction medium having a combined magnetic strip and radio frequency communications.

U.S. Pat. Nos. 7,793,851 and 7,828,220 disclose a dynamic credit card with an embedded encoder used to generate dynamic credit card account ID numbers that vary over time, can be decoded at the account manager's datacenter during purchases, and can be written onto a magnetic strip such that the number may be processed by traditional credit card merchants.

U.S. Pat. No. 7,591,416 discloses a selectable multi-purpose credit card. In one embodiment, the card includes a programmable magnetic strip along with embedded memory, buttons/contacts, and means for programming the magnetic strip with a different feature.

U.S. Pat. Nos. 7,533,828 and 7,278,581 disclose an electronic credit card device which includes a keypad, display, speaker, IR data i/o, and radio frequency components.

U.S. Pat. No. 7,306,158 discloses a process for creating a transparent or translucent transaction card with integrated chip and RFID components.

U.S. Pat. No. 7,246,752 discloses a magnetic stripe card which includes a plurality of magnetic write heads below the magnetic stripe.

U.S. Pat. No. 7,205,473 discloses a smart card with an integrated flexible photovoltaic cell or a display module.

U.S. Pat. No. 6,715,679 discloses a universal credit card that can transform into one of multiple conventional magnetic stripe-type cards.

U.S. Pat. No. 6,641,050 discloses a smart card that incorporates an electronic fuse and random number generator to improve user authentication security functions during financial transactions.

None of these references, however, teach a smart credit card wherein all integrated electronic components are powered by a radio frequency identification (RFID) antenna that is in a magnetic field. Furthermore, none of these references teach a smart credit card with a magnetic tape comprised of programmable ferromagnetic cells, in either a one-dimensional or two-dimensional grid array, with temporary configuration of proper account and authorization data through pixel control transistors.

SUMMARY OF THE INVENTION

In general, the embodiments of the present invention provide systems and methods for authorizing the use of a transaction card. Specifically, embodiments of the present invention utilize dynamic manipulation of a transaction card to authorize use of the card. In a typical embodiment, the cardholder approaches a magnetic reader with the card. The card is powered up by an embedded radio frequency identification (RFID) antenna in a magnetic field. The cardholder enters a user authorization code using an input method. The entry is compared against the predefined user authorization code. If the entry is invalid, an unauthorized code is put on virtual ferromagnetic cells (VFC) embedded in the card. If the entry is valid, legitimate card information is put into the VFC. When the card is swiped, electric field array manipulates VFC, and magnetic information on the VFC is magnetically coupled and scanned to the reader. After cardholder use, the VFC are reset to a random or unauthorized mode.

In an alternative embodiment, the cardholder approaches a magnetic reader with the card. The card is powered up by an embedded radio frequency identification (RFID) antenna in a magnetic field. The cardholder enters a user authorization code using an input method. The entry is compared against the predefined user authorization code. If the entry is invalid, an unauthorized code is put on a magnetic coil cell embedded in the card. If the entry is valid, legitimate card information is put into the magnetic coil cell. When the card is swiped, magnetic information on the magnetic coil cell is magnetically coupled and scanned to the reader.

The present invention relates to portable transaction or authorization cards including, but not limited to, credit cards, debit cards, gift cards, and identification cards. The discussion and figures herein will focus especially on credit cards. Use of the credit card as the example card discussed herein is for illustrative purposes only and not intended to be limiting. Any type of card within the scope of the present invention may be used.

A first aspect of the present invention provides a method for authorizing the use of a transaction card having a set of ferromagnetic cells, comprising: generating processing power for manipulating the set of ferromagnetic cells; receiving an authorization code as input from a user; comparing the input with a predefined value; and putting an authorization mode on the card by manipulating the set of ferromagnetic cells based on the result of the comparison.

A second aspect of the present invention provides a method for authorizing the use of a transaction card having a set of magnetic cell coils, comprising: generating processing power for manipulating the set of magnetic cell coils; receiving an authorization code as input from a user; comparing the input with a predefined value; and setting an authorization mode by manipulating the set of magnetic cell coils based on the result of the comparison.

A third aspect of the present invention provides a dynamic transaction card having a set of ferromagnetic cells used for authorizing the use of the card, comprising: a power source; a user input component configured to accept an authorization code as input from a user; a processing component configured to compare the input with a predefined value; and a manipulation control component configured to set an authorization mode by manipulating the set of ferromagnetic cells using an electrically inducted magnetic field based on the result of the comparison.

A fourth aspect of the present invention provides a dynamic transaction card having a set of magnetic cell coils used for authorizing the use of the card, comprising: a power source; a user input component configured to accept an authorization code as input from a user; a processing component configured to compare the input with a predefined value; and a manipulation control component configured to set an authorization mode by manipulating the set of magnetic cell coils using an electrically inducted magnetic field based on the result of the comparison.

BRIEF DESCRIPTION OF THE DRAWINGS

These and other features of this invention will be more readily understood from the following detailed description of the various aspects of the invention taken in conjunction with the accompanying drawings in which:

FIG. 9 depicts an electrically induced magnetic field according to an embodiment of the present invention.

Figures 1A, 1B:
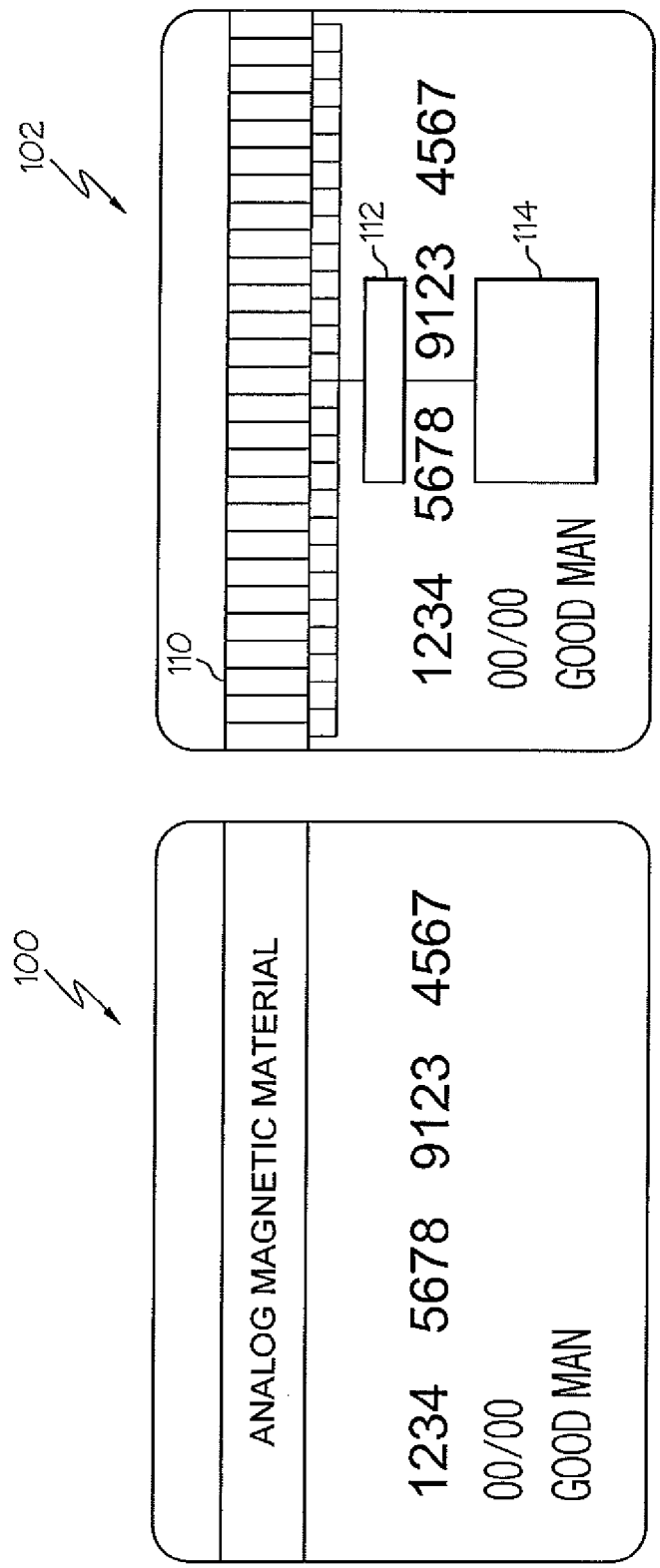
FIG. 1A depicts a conventional card having an analog and passive magnetic stripe.
FIG. 1B depicts a card having electrically controlled ferromagnetic cells according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or rectify "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

The phrase "card technologies" encompasses any technology which can be placed on a card. Typically, we think of a plastic bank card or credit card, though there are many other materials and uses of cards. However, the card is usually for providing "access" to something, such as a bank account, credit card account, secure area, etc.

The main type of card in use today is the magnetic stripe card. Magnetic stripe cards are everywhere. A magnetic stripe is the black or brown stripe on the back of a transaction card. The stripe is made of tiny, iron-based magnetic particles on a band of magnetic material on the card. The stripe stores data by modifying the magnetism of the tiny, iron-based magnetic particles on the band. The magnetic stripe is read by physical contact and swiping past a magnetic reading head. Once the data is encoded onto the magnetic stripe of a typical card, it is unchanging.

As indicated above, embodiments of the present invention provide systems and methods for validating an authorized user of a transaction card. Specifically, embodiments of the present invention utilize dynamic manipulation of a transaction card to validate a user of the card. In a typical embodiment, the cardholder approaches a magnetic reader with the card. The card is powered up by an embedded radio frequency identification (RFID) antenna in a electro-magnetic field. The cardholder enters a user authorization code using an input method. The entry is compared against the predefined user authorization code. If the entry is invalid, an unauthorized code is put on virtual ferromagnetic cells (VFC) embedded in the card. If the entry is valid, legitimate card information is put into the VFC. When the card is swiped, magnetic information on the VFC is magnetically coupled and amplified and recorded to the reader. After cardholder use, the VFC are reset to a random or unauthorized mode.

In an alternative embodiment, the cardholder approaches a magnetic reader with the card. The card is powered up by an embedded radio frequency identification (RFID) antenna in a magnetic field. The cardholder enters a user authorization code using an input method. The entry is compared against the predefined user authorization code. If the entry is invalid, an unauthorized code is put on a magnetic coil cell embedded in the card. If the entry is valid, legitimate card information is put into the magnetic coil cell. When the card is swiped, magnetic information on the magnetic coil cell is magnetically coupled, amplified, and scanned to the reader.

Referring now to FIG. 1A, conventional identification card 100 having an analog and passive magnetic tape stripe is depicted. Magnetic stripe technology was groundbreaking when introduced in the 1960's. Merchants were no longer required to cross-check credit card numbers against a list of known fraudulent accounts. The magnetic stripe allowed for faster transactions. However, some technologies are inherently susceptible to abuse. Magnetic stripe technology is one such technology. Once a sought-after convenience in nearly every industry has now become easily susceptible to fraud.

FIG. 1B depicts authorization card 102 having electrically controlled ferromagnetic cells 110 according to an embodiment of the present invention. Card 102 further includes control circuit 112 and cardholder input 114 which are discussed in detail below. Ferromagnetic materials become magnetized in a magnetic field and retain their magnetism when the field is removed. The VFC are capable of being dynamically manipulated using an electrically inducted magnetic field.

In a typical embodiment, a predefined cardholder user authorization code along with other necessary information to operate the card is loaded during card setup. The predefined user authorization code and legitimate card information are stored in the card (e.g., in non-volatile memory of the card). The cardholder input is compared against the predefined user authorization code to determine whether authorization is granted. The authorization card can be powered for ferromagnetic manipulation in one of two ways: a RFID-like power source or by smart integrated circuit (IC) contacts. Contact cards are the most common type of smart card. Electrical contacts located on the outside of the card connect to a card reader when the card is inserted. This connector is bonded to the encapsulated chip in the card.

Figure 2B:
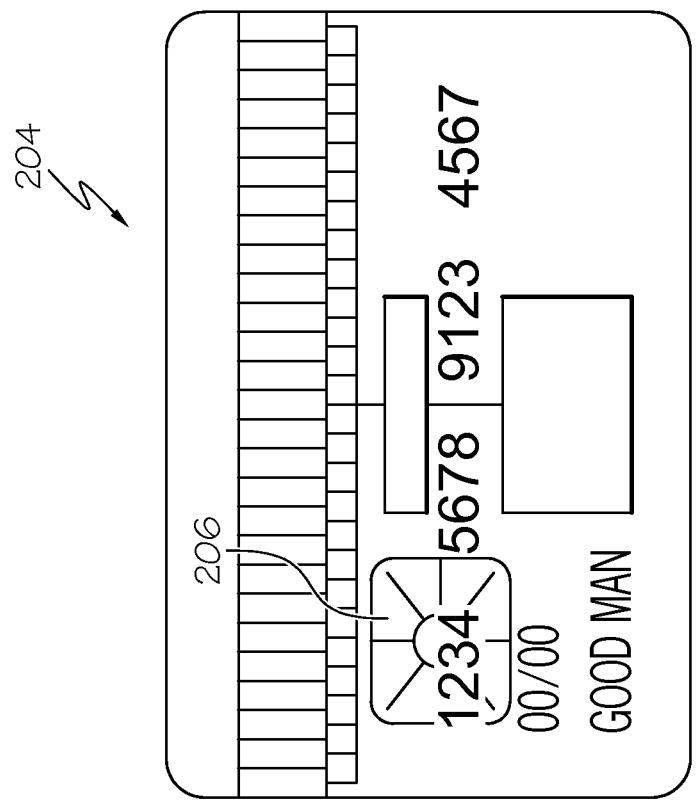
FIG. 2B depicts a card having smart IC integration according to an embodiment of the present invention.
Figure 2A:
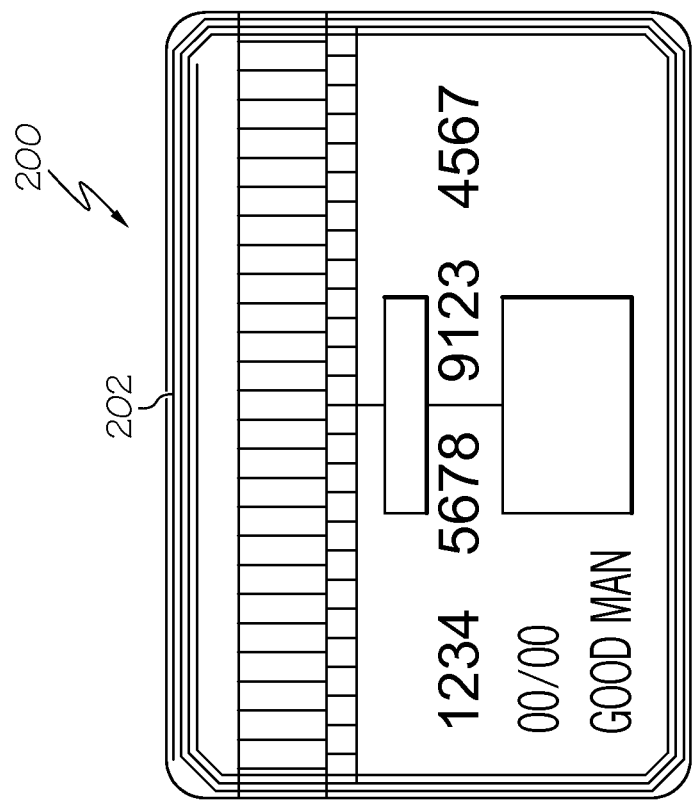
FIG. 2A depicts a card having a radio frequency identification (RFID) antenna for energy collection and communication according to an embodiment of the present invention.

FIG. 2A depicts a card having a radio frequency identification (RFID) antenna for energy collection and communication according to an embodiment of the present invention. Identification card 200 includes antenna 202. Identification card 200 can be powered by a RFID-like power source for ferromagnetic manipulation. Identification card 200 includes antenna 202 that responds to radio waves transmitted from an RFID reader. The card absorbs some of the radio frequency energy from the reader signal and reflects it back as a return signal delivering data from the magnetic cells.

FIG. 2B depicts a card having smart integrated circuit (IC) integration according to an embodiment of the present invention. Identification card 204 includes integrated circuit (IC) contacts 206. Contact cards have several contact pads. These pads provide electrical connectivity when inserted into a reader. RFID and smart IC cards are example power sources. Other example power sources may be used within the scope of the invention including, but not limited to, photovoltaic (PV) cells or a thermo-electric generator.

Figure 3A:
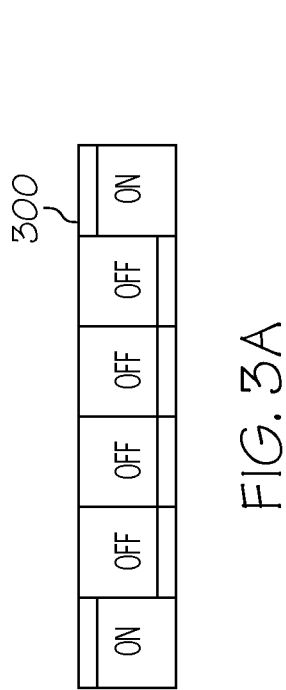
FIG. 3A depicts an on and off switch array used for cardholder input.
Figure 3B:
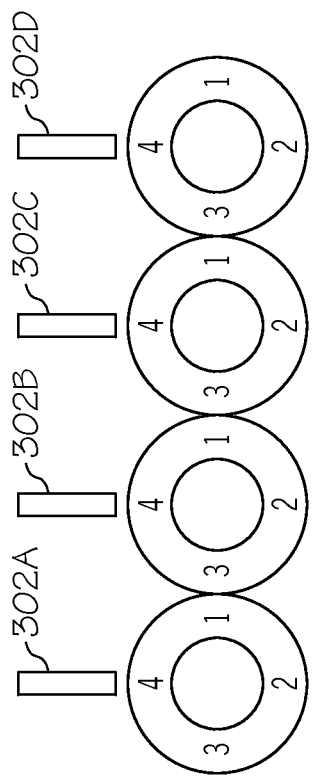
FIG. 3B depicts a rotary dial array used for cardholder input.
Figure 3C:
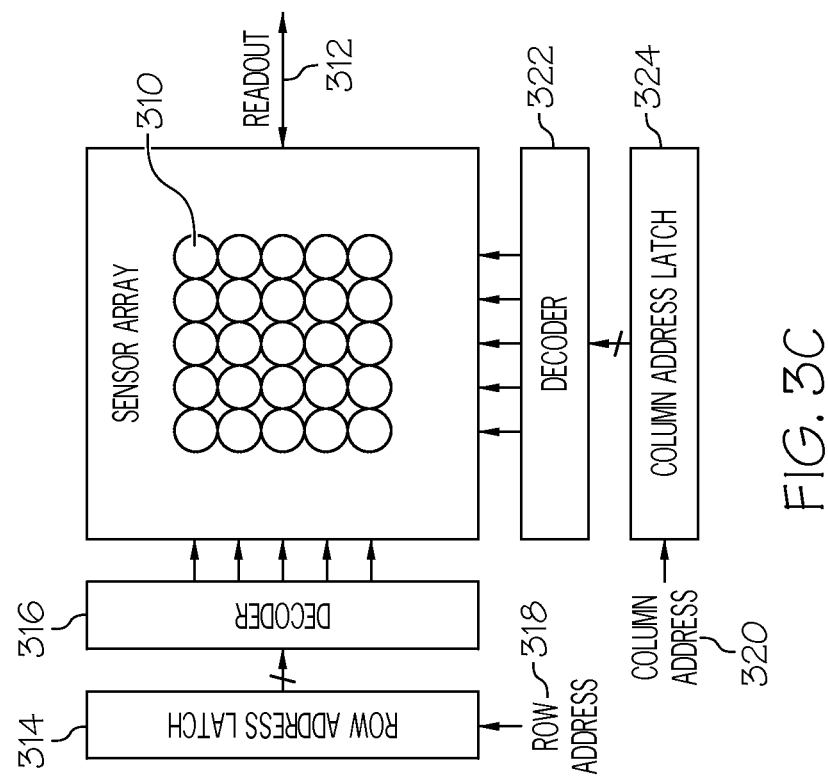
FIG. 3C depicts an imaging array used for cardholder input.

FIGS. 3A-C depict cardholder input methods. The methods listed are illustrative only and not intended to be limiting. The cardholder can predefine a user authorization code for card authorization. FIG. 3A illustrates a binary on/off switch array 300. For example, FIG. 3A illustrates six switches. Switches one and six are turned on. The remaining switches are turned off. The switches taken together represent the cardholder user authorization code.

FIG. 3B illustrates a rotary dial array. A rotary dial array may be used to form a numeric personal identification number (PIN) for card activation. For example, FIG. 3B illustrates four rotary dials 302A-D, with each dial turned to the number '4'. Each movement of the dial represents a particular value. The rotary dials taken together represent the cardholder PIN.

FIG. 3C illustrates an imaging array which may be used for higher degree information including a biometric fingerprint. The imaging array includes row address 318, row address latch 314, decoder 316, column address 320, column address latch 324, decoder 322, photo-detecting pixel 310, and readout 312. The sensor array includes an array (columns and rows) of photo-detecting pixels (e.g., pixel 310). Cardholder information corresponding to row address 318 is latched into row address latch 314, and then cardholder information corresponding to column address 320 is latched into column address latch 324. They are then decoded (by decoders 316 and 322, respectively) to select the particular pixel location(s). Selected pixels determine readout 312 which relates to cardholder information.

Figure 4B:
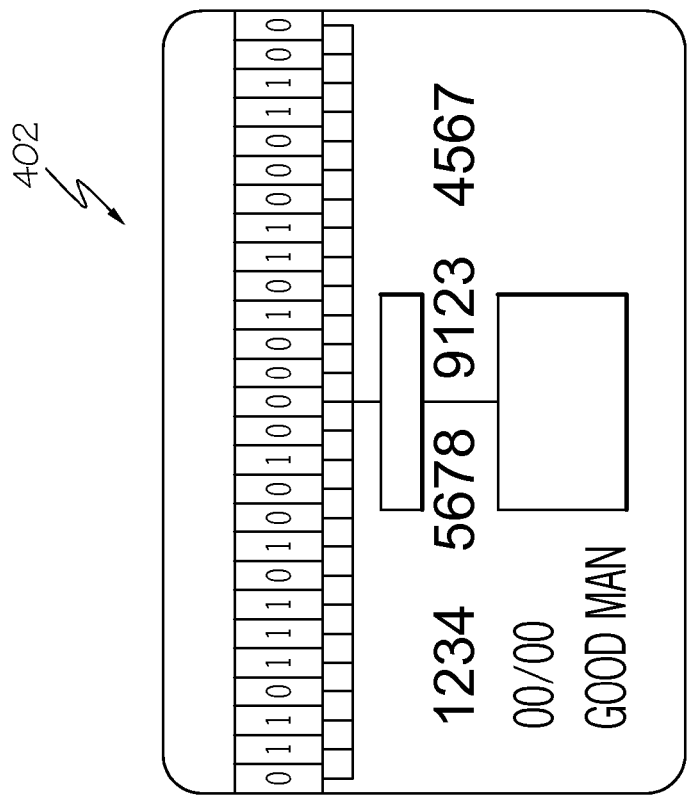
FIG. 4B depicts a card in which the VFC is activated when cardholder-identifiable input is present or the cardholder intends to use the card according to an embodiment of the present invention.
Figure 4A:
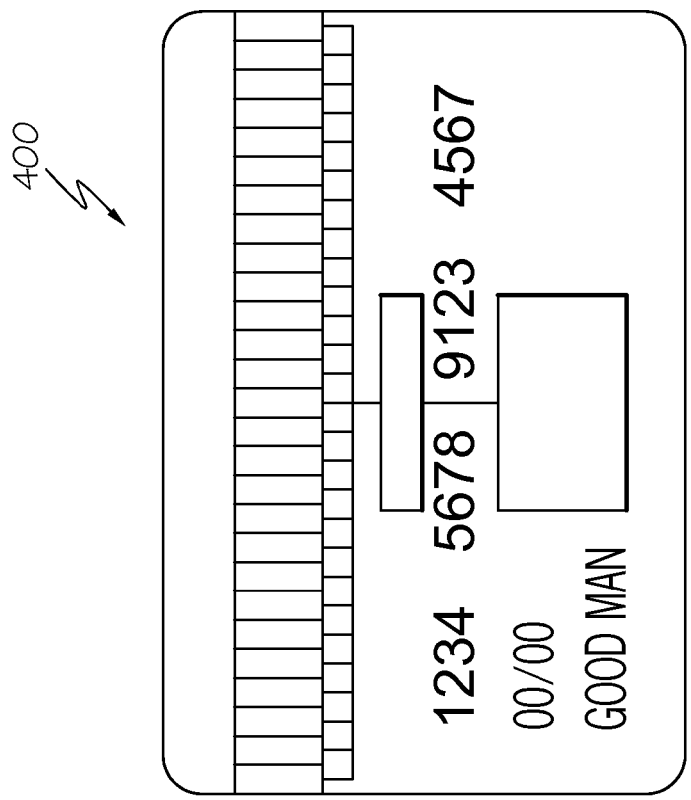
FIG. 4A depicts a card in which the VFC are in random or unauthorized mode when no cardholder input, or not in use according to an embodiment of the present invention.

FIG. 4A depicts a card in which the VFC are in random or unauthorized mode when no cardholder input, or not in use according to an embodiment of the present invention. Without cardholder-identifiable input, VFC are setup for either random data or unauthorized mode.

FIG. 4B depicts a card in which the VFC are activated when cardholder-identifiable input is present or the cardholder intends to use the card according to an embodiment of the present invention. The VFC are reset to either random data or unauthorized mode after cardholder use.

Figure 5:
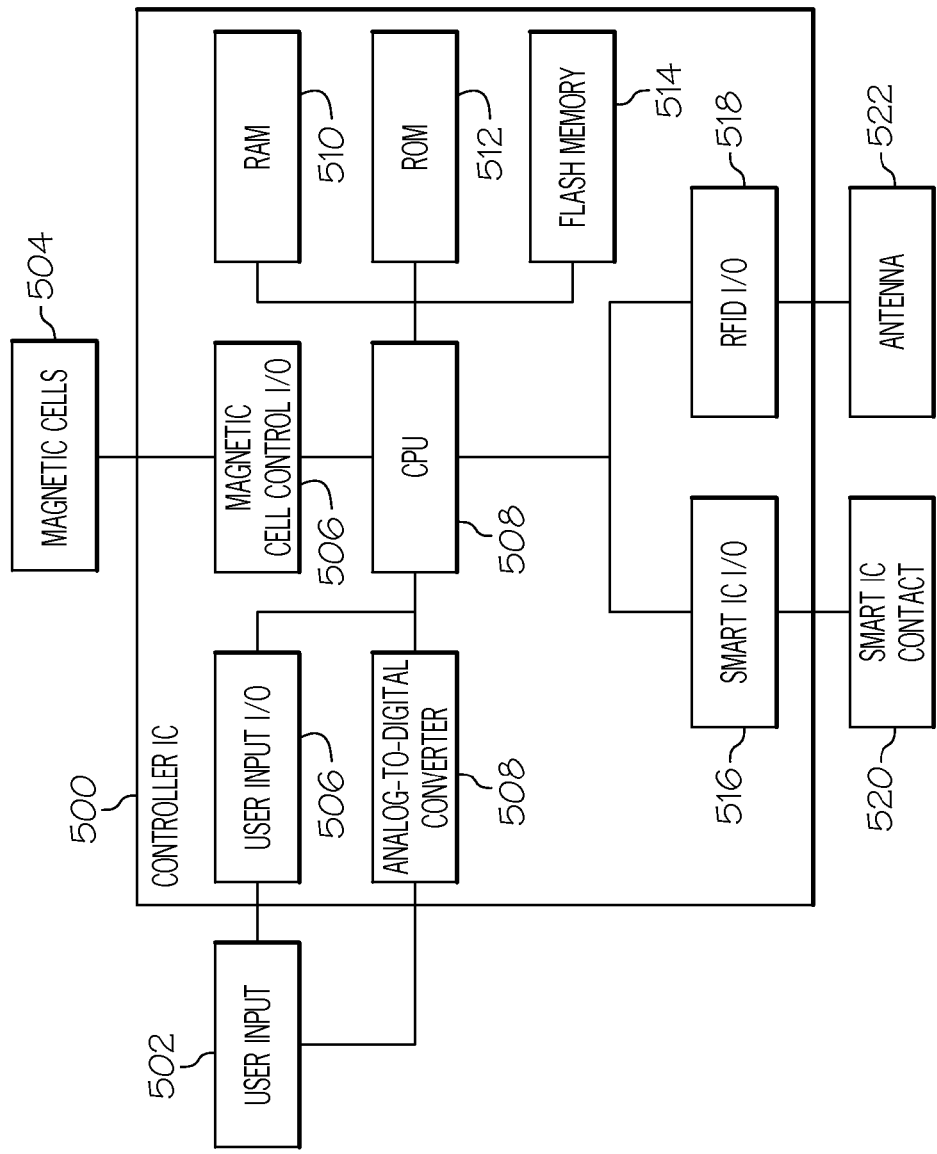
FIG. 5 depicts an integrated circuit (IC) controller block diagram according to an embodiment of the present invention.

Referring now to FIG. 5, an integrated circuit (IC) controller block diagram according to an embodiment of the present invention is shown. Controller 500 components relating to cardholder/user input include user input 502, user input I/O 506, and analog-to-digital converter (ADC) 508. The user inputs a user authorization code that is compared against a predefined code to determine authorization. The authorization card can be powered for ferromagnetic manipulation in one of two ways: a RFID-like power source or by smart integrated circuit (IC) contacts. Controller IC 500 components relating to smart contacts include smart IC contact 520 and smart IC I/O 516. Controller 500 components relating to RFID include antenna 522 and RFID I/O 518. Controller 500 components relating to processing include CPU 508, RAM 510, ROM 512, and flash memory 514. The remaining components include magnetic cells 504 and magnetic cell I/O 506.

Figure 6:
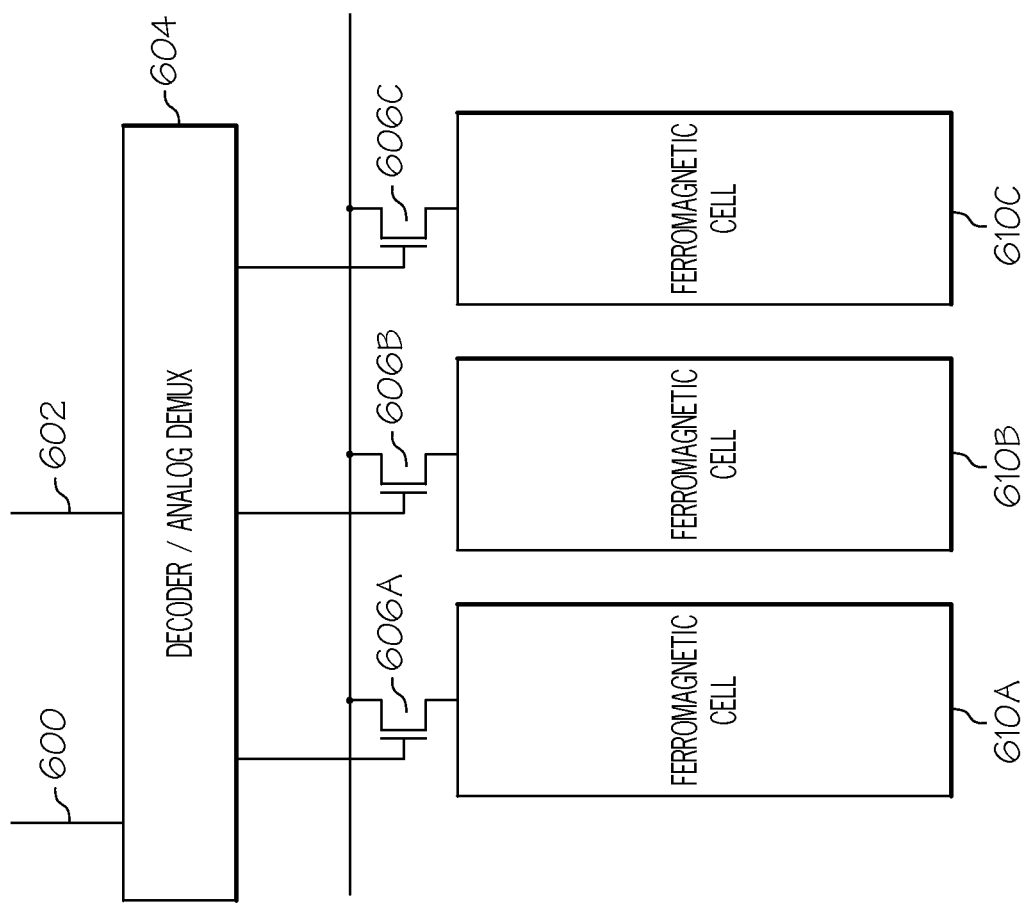
FIG. 6 depicts a ferromagnetic cell control according to an embodiment of the present invention.

FIG. 6 depicts a ferromagnetic cell control according to an embodiment of the present invention. Ferromagnetic cells 610A-C are coupled to pixel control transistors 606A-C, respectively. A transistor is a semiconductor device used to amplify and switch electronic signals. Cell control 600 and column address 602 are coupled to decoder/analog demultiplexer 604. The components control the VFC. Data is put to the ferromagnetic cells based on the authorization code entered by the user. Data is sent from the ferromagnetic cells to the reader when the card is swiped.

Figure 7B:
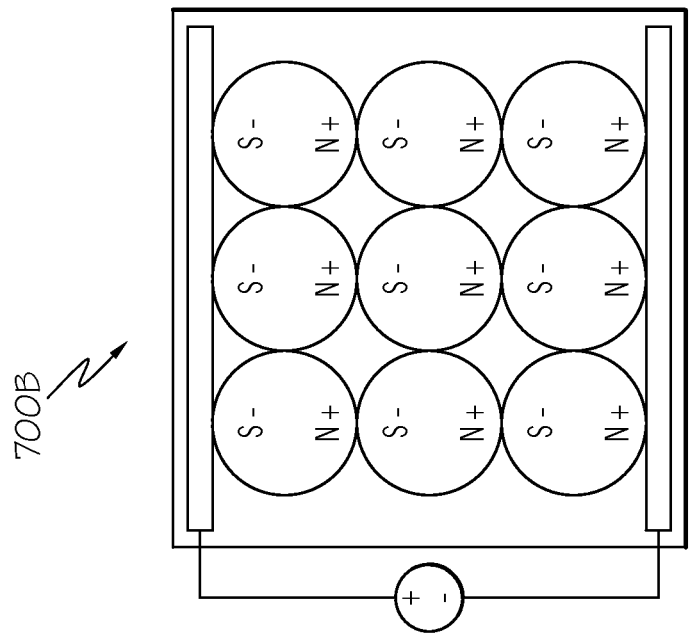
FIG. 7 depicts a virtual ferromagnetic cell with nanoparticle according to an embodiment of the present invention.
Figure 7A:
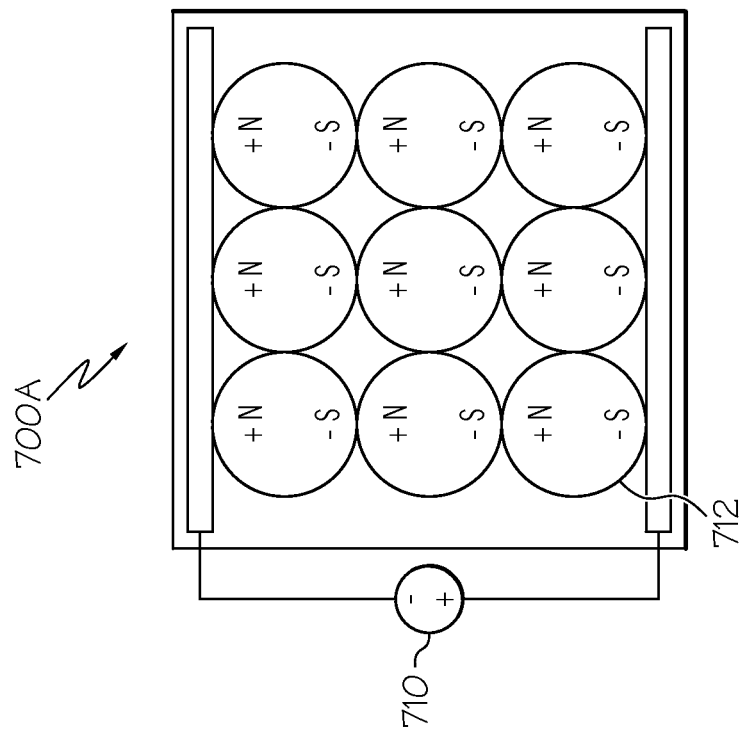

FIG. 7 depicts a VFC with nanoparticle according to an embodiment of the present invention. Ferromagnetic cells 700A-B are depicted with ferromagnetic cell 700A-B being illustrated in detail. Electric field 710 is applied to ferromagnetic cell 700 causing electrically charged beads with magnetic dipole 712. Magnetic dipole is the generation of a magnetic field in which the field is considered to emanate from two opposite poles, as in the north and south poles of a magnet, much as an electric field emanates from a positive and a negative charge (each of which is a Monopole). The virtual ferromagnetic cell uses micro/nano particles charged with electric charge and magnetic dipole. The nanobeads possess both electrical and magnetic properties.

Figure 8B:
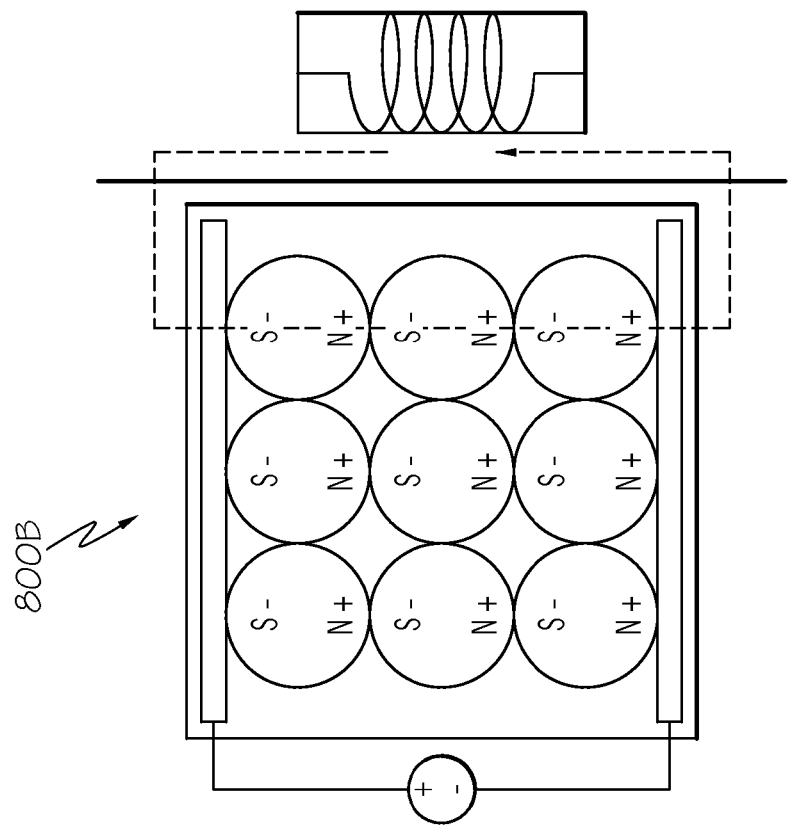
FIG. 8 depicts a virtual ferromagnetic cell with a reader according to an embodiment of the present invention.
Figure 8A:
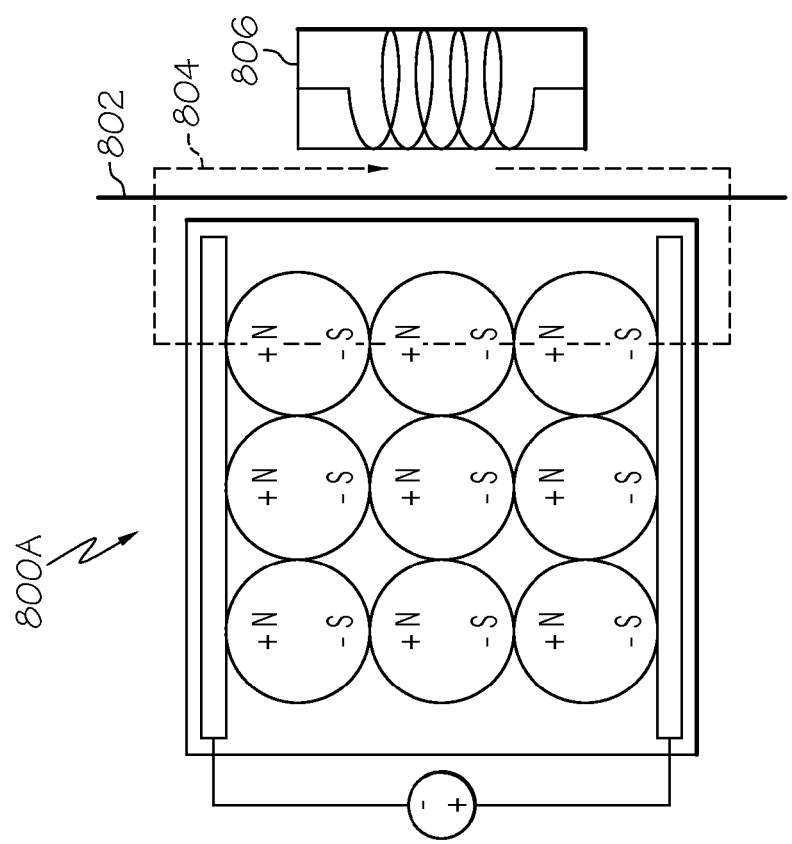

FIG. 8 depicts a virtual ferromagnetic cell with a reader according to an embodiment of the present invention. Ferromagnetic cells 800A-B are depicted with ferromagnetic cell 800A and accompanying reader illustrated in detail. Ferromagnetic cell 800A generates magnetic field 804 at card surface 802, and magnetic field 804 is coupled to card magnetic reader 806 in order to send information from the card to the reader.

FIG. 9 depicts an electrically induced magnetic field caused by a magnetic reader. Magnetic coil cells 900A-D are depicted. Magnetic information cell 910 is shown which holds information held on the card. The upward arrow describes the magnetic field inside solenoid 912. The external magnetic field is opposite. The magnetic reader reads the external field. There is no need to use conventional magnetic tape for cardholder information.

Figure 10B:
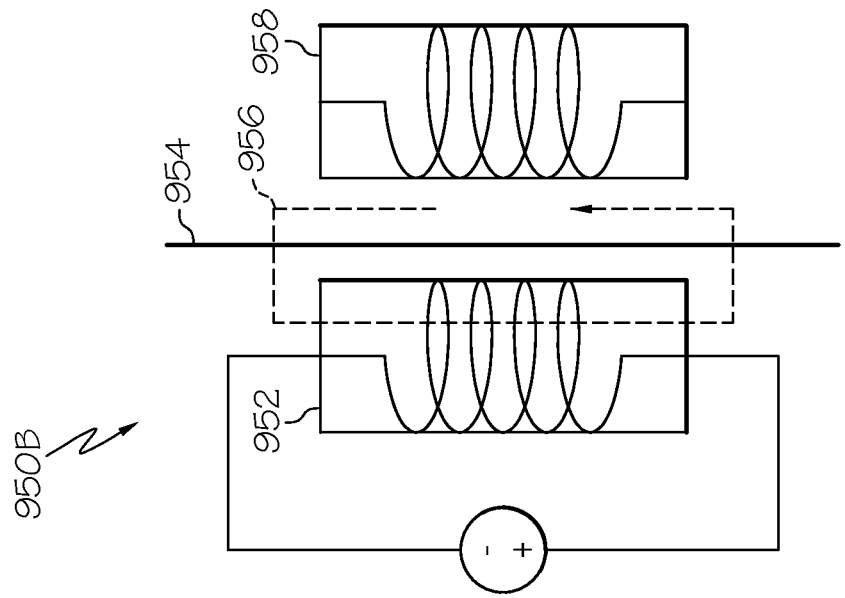
FIG. 10 depicts magnetic programming with a solenoid according to an embodiment of the present invention.
Figure 10A:
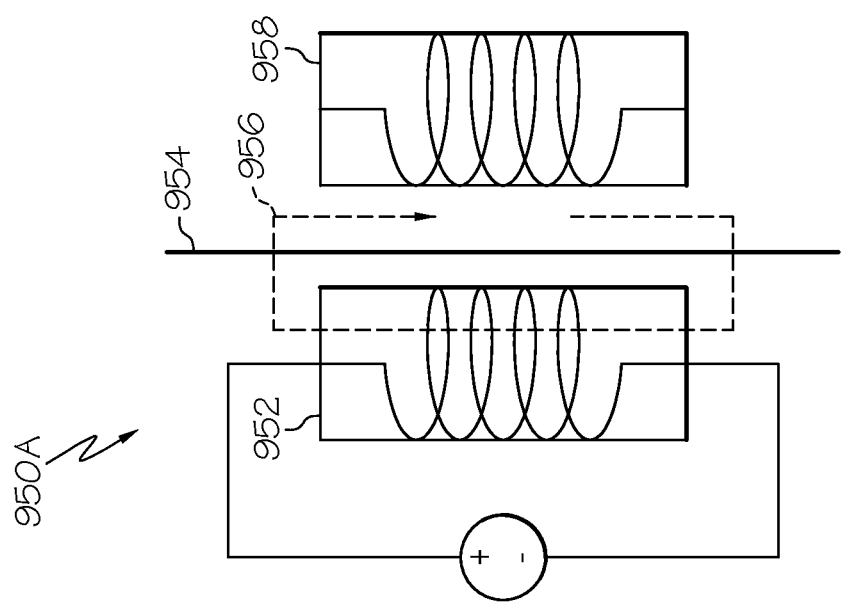

FIG. 10 depicts magnetic programming with a solenoid. Magnetic coil cells 950A-B are depicted with magnetic cell 950A and accompanying reader 958 illustrated in detail. Magnetic cell 950A generates induced magnetic field 956 at card surface 954, and magnetic field 956 is coupled to card magnetic reader 958. Magnetic transducer (solenoid) 952 gives magnetic information to magnetic reader 958 when necessary (i.e., when the card is swiped). Inductive coupling is used to transmit the information from the card.

Figure 11:
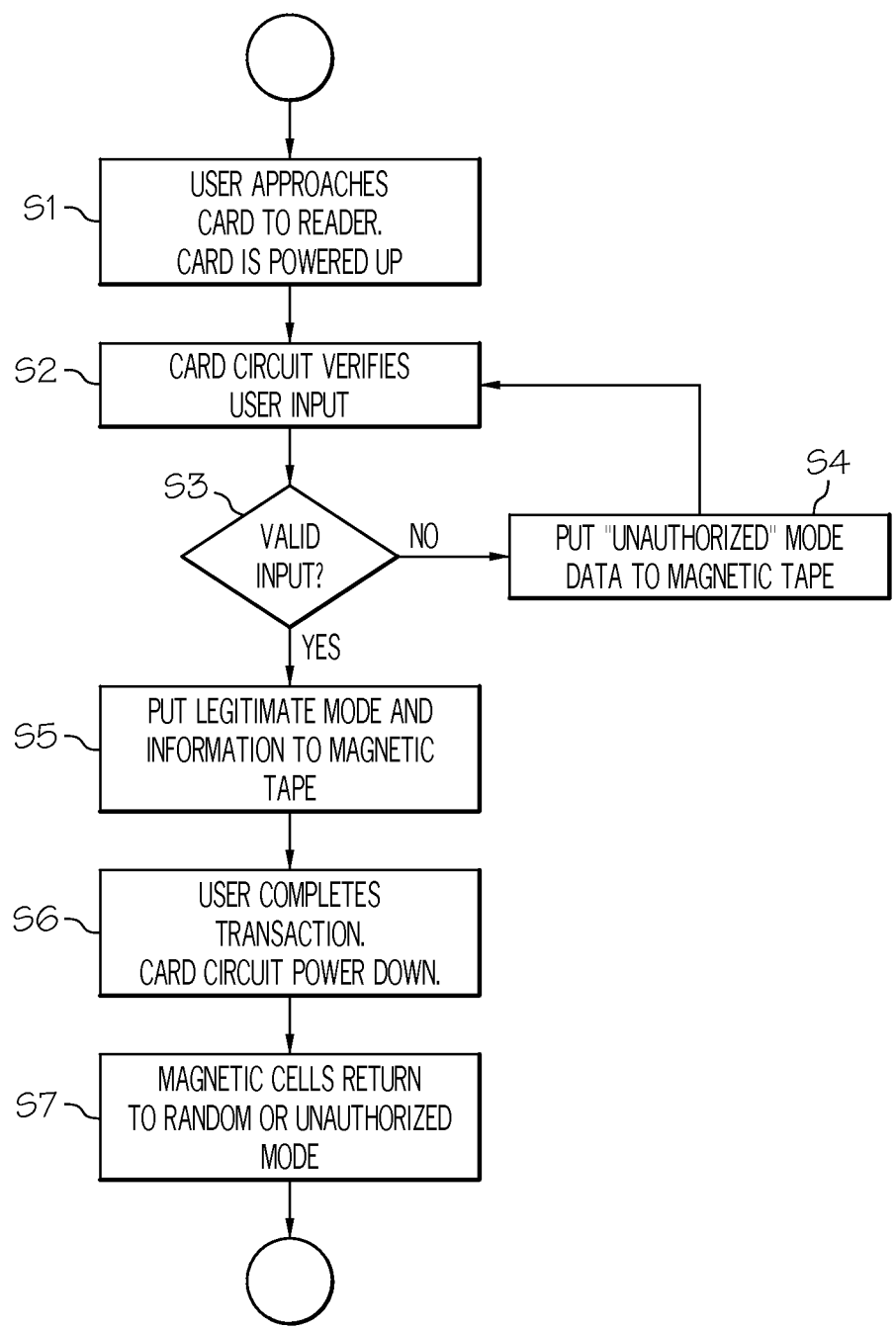
FIG. 11 depicts a flow diagram according to an embodiment of the present invention.

FIG. 11 depicts a flow diagram according to an embodiment of the present invention. A cardholder approaches a card reader with his card and the card powers up (step S1). The cardholder inputs the user authorization code and the card circuit verifies the user authorization code (step S2). A determination is made whether the cardholder input is valid (step S3). If the cardholder input is not valid, unauthorized mode data is put into the ferromagnetic cells on the card (step S4). If the cardholder input is valid, authorized mode data and legitimate card information are put into the ferromagnetic cells on the card (step S5). The cardholder completes the transaction and the card powers down (step S6). The magnetic cells on the card return to random or unauthorized mode (step S7).

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method of authorizing the use of a transaction card having a set of ferromagnetic cells, comprising:
   generating processing power for manipulating the set of ferromagnetic cells;
   receiving an authorization code as input from a user via at least one of a binary on/off switch array, a rotary dial array, and a biometric sensor;
   comparing the input with a predefined value; and
   putting an authorization mode on the set of ferromagnetic cells by manipulating the set of ferromagnetic cells based on the result of the comparison, wherein the authorization mode comprises legitimate information corresponding to the user.

2. The method of claim 1, further comprising putting legitimate card information on the set of ferromagnetic cells by manipulating the set of ferromagnetic cells when the result of the comparison is a match.

3. The method of claim 1, further comprising putting an unauthorized mode on the set of ferromagnetic cells by manipulating the set of ferromagnetic cells when the card is not in use.

4. The method of claim 1, further comprising generating power for communication with a magnetic reader.

5. The method of claim 1, further comprising communicating the information on the set of ferromagnetic cells with a magnetic reader.

6. The method for authorizing the use of a transaction card having a set of magnetic cell coils, comprising:
   generating processing power for manipulating the set of magnetic cell coils;
   receiving an authorization code as input from a user;
   comparing the input with a predefined value; and
   dynamically manipulating the set of magnetic cell coils between an authorization mode and an unauthorized mode based on the result of the comparison
   wherein the authorization mode comprises legitimate information corresponding to the user.

7. The method of claim 6, further comprising putting legitimate card information on the card by manipulating the set of magnetic cell coils when the input matches the predefined value.

8. The method of claim 6, further comprising generating power for communication with a magnetic reader.

9. The method of claim 6, further comprising communicating the information on the set of magnetic cell coils with a magnetic reader.

10. A dynamic transaction card having a set of ferromagnetic cells used for authorizing the use of the card, comprising:
    a power source;
    a user input component configured to accept an authorization code as input from a user, the user input component comprising at least one of a binary on/off switch array, a rotary dial array, and a biometric sensor;
    a processing component configured to compare the input with a predefined value; and
    a manipulation control component configured to dynamically manipulate the set of ferromagnetic cells between an authorization mode and an unauthorized mode using an electrically inducted magnetic field based on the result of the comparison,
    wherein the authorization mode comprises legitimate information corresponding to the user, and
    wherein the unauthorized mode comprises random information.

11. The card of claim 10, wherein the manipulation control component is further configured to manipulate the ferromagnetic cells to include predefined card information when the result of the comparison is a match.

12. The card of claim 10, wherein the power source is generated from electrical contacts.

13. The card of claim 10, wherein the manipulation component is further configured to set an unauthorized mode by manipulating the set of ferromagnetic cells when the card is not in use.

14. A dynamic transaction card having a set of magnetic cell coils used for authorizing the use of the card, comprising:
    a power source;
    a user input component configured to accept an authorization code as input from a user, the user input component comprising at least one of a binary on/off switch array, a rotary dial array, and a biometric sensor;
    a processing component configured to compare the input with a predefined value; and
    a manipulation control component configured to dynamically manipulate the set of magnetic cell coils between an authorization mode and an unauthorized mode using an electrically inducted magnetic field based on the result of the comparison,
    wherein the authorization mode comprises legitimate information corresponding to the user, and
    wherein the unauthorized mode comprises random information.

15. The card of claim 14, wherein the manipulation component further configured to manipulate the magnetic cell coils to include predefined card information when the result of the comparison is a match.

16. The card of claim 14, wherein the power source is generated from an electrically inducted magnetic field created between an inductive transducer and a magnetic reader.

17. The card of claim 14, wherein the power source is generated from electrical contacts.

18. The card of claim 16, wherein the inductive transducer further configured to communicate with the magnetic reader using the electrically inducted magnetic field.

* * * * *